Dec. 6, 1927.
C. E. H. ARMBRUSTER
MACULAR REFLECTOSCOPE
Filed May 24, 1926
1,651,661
2 Sheets-Sheet 2
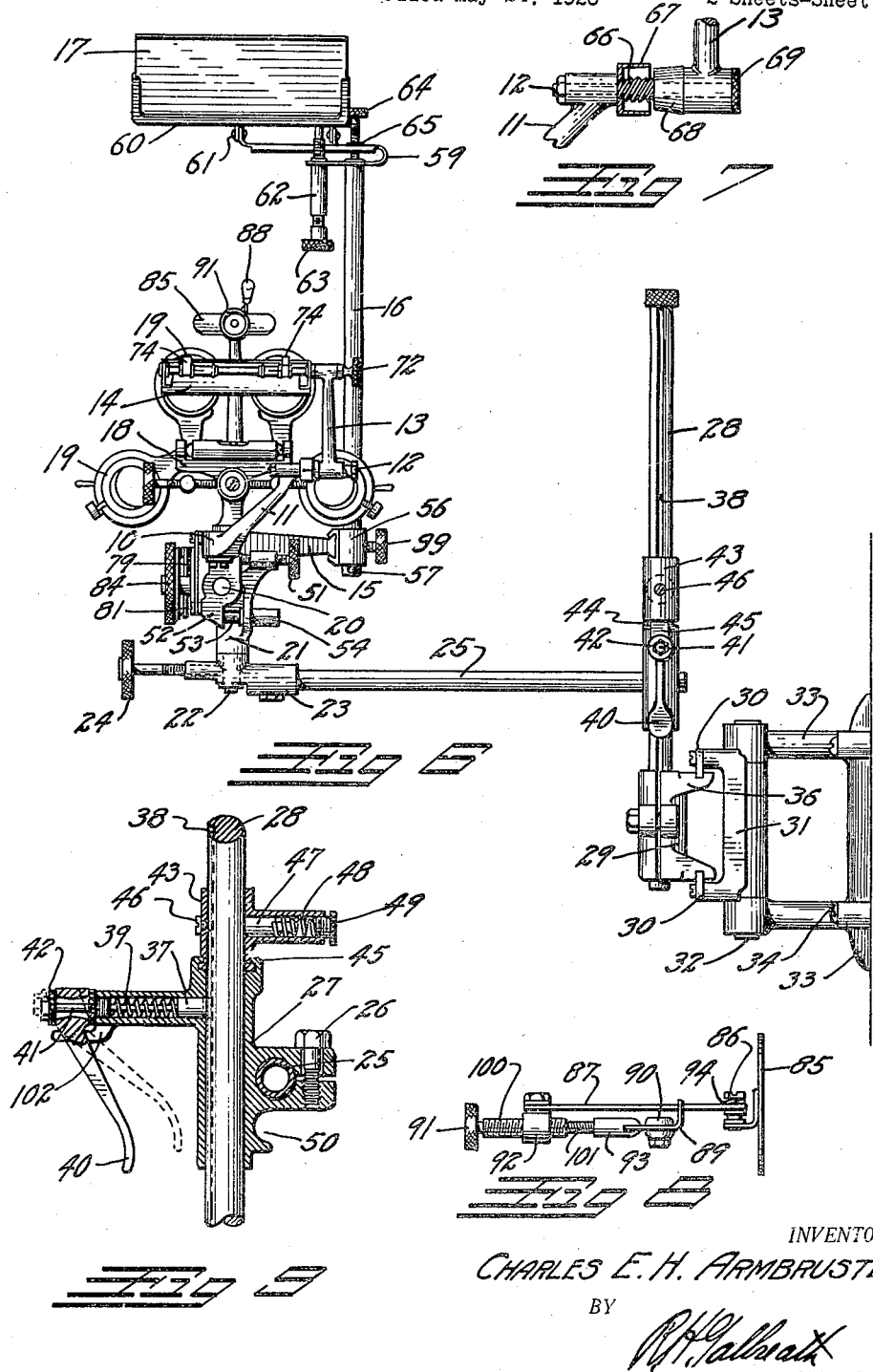
INVENTOR.
CHARLES E. H. ARMBRUSTER
BY
ATTORNEY.

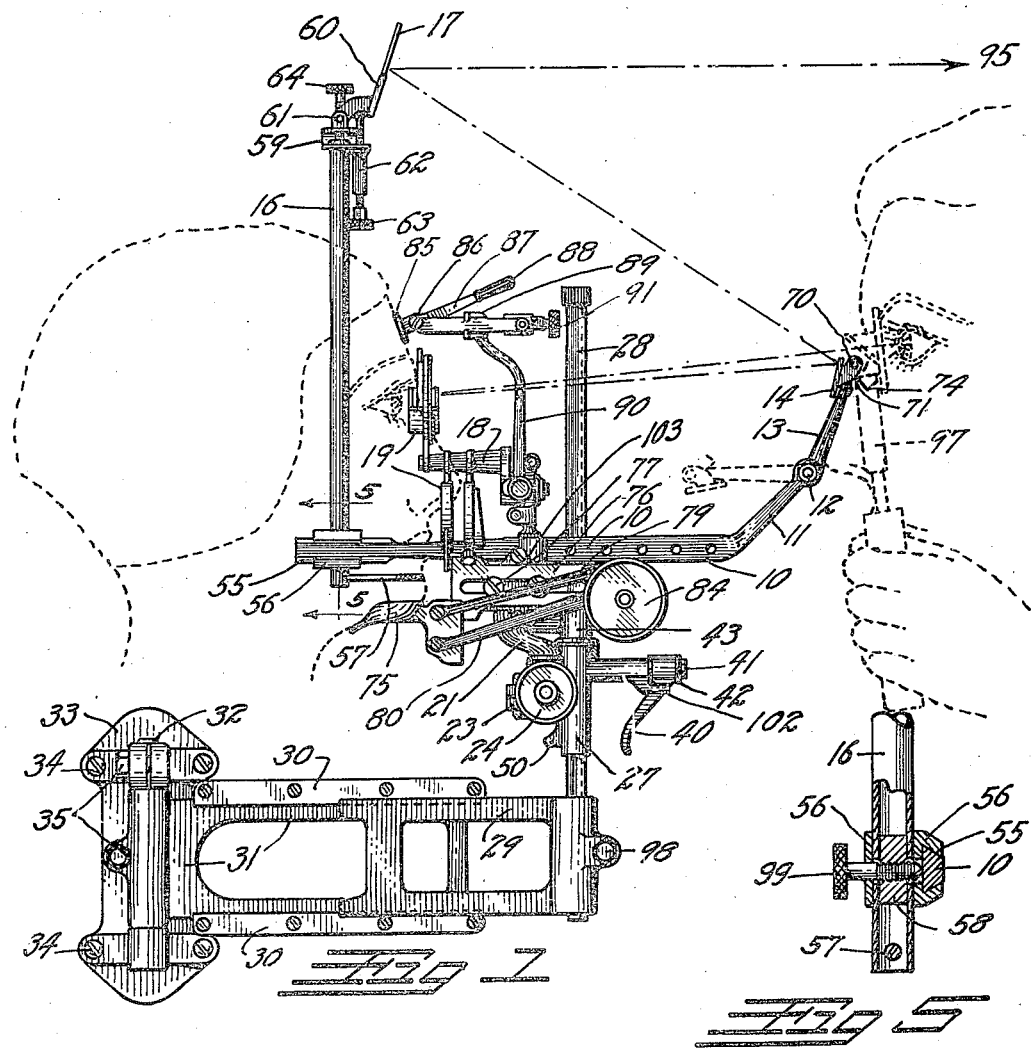

Patented Dec. 6, 1927.

1,651,661

UNITED STATES PATENT OFFICE.

CHARLES E. H. ARMBRUSTER, OF DENVER, COLORADO.

MACULAR REFLECTOSCOPE.

Application filed May 24, 1926. Serial No. 111,257.

This invention relates to an optometer employing mirrors for reflecting an image of the fixation object and adapted to be used by refractionists in measuring the refractions of the eye, by the use of a retinoscope, for prescribing lenses therefor. It is more particularly applicable to reflectoscopes of the class illustrated and described in my United States Letters Patent, No. 1,190,619, issued July 11, 1916, and Letters Patent No. 1,469,411, issued October 2, 1923.

The principal object of this invention is to incorporate the features of the above noted patents, and improvements thereon, in a single efficient unit.

Another object of the invention is to provide a series of adjusting mechanisms, by means of which any desired adjustment can be obtained and in which all the necessary controls are within convenient reach of the operator.

A further object of the invention is to provide novel means for resting the chin and forehead of the patient which can be readily adjusted to suit the requirements of various patients.

A still further object is to provide means for effectively supporting and adjusting the upper mirror upon the same frame which supports the lower mirror.

Other objects and advantages reside in the detail construction of the invention, which is designed for simplicity, economy, and efficiency. These will become more apparent from the following description.

In the following detailed description of the invention, reference is had to the accompanying drawings, which form a part hereof. Like numerals refer to like parts in all views of the drawings and throughout the description.

In the drawings:

Fig. 1 is a side elevation of my improved reflectoscope. In this view the relative positions of the patient and operator are illustrated in broken line and the lines of vision or reflection are illustrated in dot dash line.

Fig. 2 is a detail view illustrating the chin rest employed in the device.

Figs. 3 and 4 are detail views illustrating the lower or fixation-object mirror.

Fig. 5 is a detail view illustrating the clamping means employed on the upper mirror supporting arm on line 5—5, of Fig. 1.

Fig. 6 is an elevation of the complete device, looking from the operator's position.

Fig. 7 is a detail view of the clamping hinge employed on the lower mirror.

Fig. 8 is a detail view of the forehead rest.

Fig. 9 is a detail cross sectional view through the supporting arm clamp.

The invention comprises a main frame 10, one extremity of which is turned upwardly and sidewardly, as shown at 11, terminating in a hinge 12 which is illustrated in detail in Fig. 7. Hinged at 12 is a lower mirror arm 13 carrying a relatively narrow lower or fixation image mirror 14. The opposite extremity of the frame 19 projects sidewardly, as shown at 15, Fig. 6, and supports a mirror post 16, which carries an upper mirror 17.

Mounted substantially at the mid-portion of the frame 10 is one of the usual trial frames 18 carrying a series of lens frames 19 for placement before the eyes of the patient and in which the trial lenses are placed, as is usual in the art.

The frame 10 is pivoted at 20 to a supporting bracket 21 which in turn is pivoted at 22, in a sleeve 23 and locked against rotation by means of a set screw 24. The sleeve 23 is clamped to the extremity of the supporting arm 25 which in turn is clamped, by means of a clamp screw 26, to a supporting arm bracket 27. The supporting arm bracket 27 is vertically slidable upon a column 28 which is mounted in a carriage 29. The carriage 29 rides between parallel tracks 30 carried on a base frame 31, and is provided with projecting feet 36 having suitable grooves for engagement with the tracks 30. No clamping means are necessary to secure the carriage 29 to the base frame 31, the weight of the device being sufficient to maintain it in any desired position on the tracks.

The base frame 31 may be rotated on a shaft 32, supported in a base 33, to project at any desired angle, and is locked in the desired position by means of clamp screws 35. The base 33 is attached to the wall of the room or any suitable supporting structure by means of suitable screws 34.

The supporting arm bracket 27 carries a shoe 37 which is forced into a groove 38, formed in the column 28, by means of a spring 39, when the device is in the operative position. This effectively prevents rotation of the bracket 27 about the column 28 while the device is in use. When it is desired to rotate the supporting arm 25 about the column 28, a lever 40 is depressed as indicated in broken line in Fig. 9. The lever 40 operates between ears 102 on the bracket 27 and loosely engages a stem 41 upon the shoe 37. When depressed, it acts against a collar 42 on the stem 41 to withdraw the shoe from the groove 38.

The pressure of the shoe 37 against the column 28 assists in maintaining the supporting arm bracket at any desired elevation on the column 28. To support the bracket when the shoe 37 is out of engagement and to assist it at all times in supporting the bracket, a carrying sleeve 43 is mounted above the supporting arm bracket 27. The carrying sleeve supports the bracket by means of a groove 44 in which tongues 45 on the bracket engage. This arrangement allows the bracket 27 to be freely rotated on the carrying sleeve 43 without becoming separated therefrom. The carrying sleeve is prevented from rotation by means of a set screw 46 which slidably engages in the groove 38 and is maintained at any desired position on the column 28 by means of a second shoe 47. The shoe 47 is clamped against the column by means of a spring 48, the compression of which may be adjusted by a cap nut 49. The tension of the spring 48 should be just sufficient to support the device upon the column, but sufficiently free to allow the bracket 27 and carrying sleeve 43 to be moved vertically of the column when the shoe 37 is out of engagement therewith.

In operation, the operator engages a finger hold 50 with his forefinger and the lever 40 with his thumb, gripping the column 28 with his remaining fingers. In this position, ready vertical adjustment may be made of the entire device upon the column 28.

The vertical angle of the trial frame 18 and upper mirror post 16 may be adjusted by means of adjusting screw 51 which contacts with the frame 10 above the pivot 20. Below the pivot 20, the frame 10 is provided with a lug 52 against which a plunger 53 contacts. The plunger 53 is actuated by means of a spring carried in a spring cup 54 so as to constantly tend to swing the trial frame to the right, the swing being limited by the adjusting screw 51.

A method of attaching the mirror post 16 is illustrated in detail in Fig. 5. The extremity of the frame 10 is dove-tailed, as shown at 55, and engaged by a dove-tailed bracket 56 through which the post 16 passes. A clamp screw 57 passes through the bracket 56 into contact with the frame 10, and is threaded into a loose block 58 within the post 16. The openings for the passage of the screw 99 through the post 16 are sufficiently large to allow a limited rotation of the post within the bracket 56, the post being rotated by means of a lever 57. The bracket 56 can be placed in any position along the dove-tailed extremity of the frame 10 and, when in the proper horizontal and angular position, is clamped in place by tightening the screw 99. Tightening of this screw causes the block 58 to be drawn against one side of the interior of the post 16 and forces the extremity of the screw against the frame 10. By this arrangement, a single screw is made to lock the post against both rotative and horizontal movement.

Upon the upper extremity of the post 16 a horizontal U-shaped leaf spring 59 is secured. Upon one extremity of the spring 59 a frame 60 is pivoted at 61, in which the mirror 17 rests. Upon the other extremity of the spring 59, a socket 62 carries an adjusting screw 63 which contacts with the frame 60 so as to rotate the latter upon its pivots. The horizontal angle of the mirror 17 is adjusted by expanding or contracting the spring 59 by means of a second adjusting screw 64, which is threaded into the spring 59 at 65 and contacts with the upper extremity of the post 16.

When not in use, the lower mirror 14 is swung about the pivot 12 to the broken line position of Fig. 1. The pivot 12 is of unusual construction and is illustrated in detail in Fig. 7. The pivot pin 12 is rigidly carried by the arm 11, extends through the arm 13 and is provided with rapid pitch threads 66 which, when the arm 13 is rotated, draw it toward the arm 11. A clutch cup 67 is clamped to the arm 11 and receives a tapered hub 68 on the arm 13 when the two arms are in their adjacent position. When the arm 13 is turned to the broken line position of Fig. 1, it will move outwardly and contact with a head 69 on the pivot 12, which serves as a stop to limit the downward movement. When the arm 13 is turned upwardly to the solid line position of Fig. 1, the hub 68 will be wedged into the clutch cup 67 which serves as a stop to limit upward movement and also exerts a clamping action on the hub which rigidly supports the arm 13 in its operable position.

The mirror 14 is supported on a shaft 70 which passes through ears 71 on the rear of the mirror. The mirror is clamped at any desired angle on the arm 13 by means of a clamp nut 72. Upon the shaft 70, two sliding spring sleeves 73 are carried, each of which carry a rotatably-mounted vision finder 74, the action of which will be later described.

The device is provided with a chin rest 75 for the support of the head of the patient. This chin rest is vertically slidable upon the extremity of a chin rest frame 76 which may be moved horizontally upon screws 77. The screws 77 are threaded into a plate 103 which is attached to the frame 10, and loosely contact with and ride in a longitudinal groove 78 in the frame 76. Extending from the chin rest 75 are two parallel supporting bars 79 and 80. The upper bar 79 terminates in a pivot at each extremity. The lower bar 80 is pivoted at the chin rest extremity and terminates at the other extremity in a lever 81. The lever 81 terminates in a cam follower 82 which rides in a cam track 83 formed in the rear face of an adjusting wheel 84. The wheel 84 is journaled on one extremity of the chin rest frame 76. By this arrangement, rotation of the adjusting wheel will move the cam follower to or from the wheel axis, thereby rotating the lever 81 about its pivot and raising or lowering the chin rest 75 as desired.

The device is also provided with a forehead rest 85 pivoted at 86 to a forehead rest frame 87. The forehead rest is provided with an adjusting handle 88 to facilitate its placement to the angle of the patient's forehead. The frame 87 is slidably mounted between angularly turned extremities on a frame support 89, which is rigidly secured to a supporting arm 90 projecting from the trial frame 18. The frame 87 may be moved horizontally by means of an adjusting screw 91 which is threaded into a collar 92 carried by the frame 87 and into a lug 93 carried by the support 89. The threads on the adjusting screw 91 are in different directions in the collar 92 and lug 93, so that rotation of the screw will move both it and the collar 92 in the same direction. This arrangement gives a multiplication of movements so that a minimum movement of the adjusting screw will give a maximum movement of the forehead rest. The pivot 86 is provided with a spring washer 94 to maintain it in any desired position.

The operation of the reflectoscope will now be described. The entire device is swung before the patient until the shoe 37 rides in the groove 38. The supporting arm bracket is raised or lowered by manipulation of the lever 40 until the trial frames are approximately in alignment with the patient's eyes. The device is now adjusted horizontally in the track 30 until approximately in the proper horizontal position before the eyes. The chin rest 75 is adjusted horizontally and vertically by means of the wheel 84 until the patient's eyes are centered immediately behind the trial frames 19, and the adjusting screw 91 and handle 88 are adjusted until the forehead rest forces the patient the proper distance from the trial frames.

The patient is now directed to look at a character on a trial card positioned at the rear of the operator in the direction indicated by the arrow 95. The operator now adjusts the screw 63 so as to swing the upper mirror 17 to bring the image of the character adjacent the upper edge of the mirror 14. It should be noted here that the thread on the screw 63 is left hand for the convenience of the operator so that when the patient tells him the image is too low, by turning the screw in the natural right hand direction, he will raise it. When the image has been brought to the upper edge of the mirror 14, one of the patient's eyes is obscured and the finder 74 immediately in front of that eye is turned over the upper edge of the mirror 14, as indicated at A, Fig. 4 and its sleeve 73 is slid along the shaft 70 until the patient states that the image is covered by the finder. This operation is now repeated with the other eye and the other finder and the finders are then turned back to the position B, Fig. 4, where they will serve as sights to enable the operator to align his line of vision exactly with the line of vision of the patient. Each of the finders 74 is provided with a white band 96 which is clearly visible to the operator in the semi-darkness so that no difficulty is experienced in finding the vision lines of the patient. The operator now proceeds with the refracting examination by means of a retinoscope, indicated in broken line at 97, Fig. 1.

It is well known in the art that any material angle between the operator's line of vision and the patient's line of vision will result in an error in the desired correction and it is desired to call attention to the fact that in the use of this reflectoscope, there is no variation in horizontal angle between the two lines of vision since the operator looks immediately over the line of vision of the patient. There is but negligible vertical angular difference since the patient is looking into the upper part of the mirror 14 at the image of the fixation letter and the operator is looking immediately thereover, in the positions formerly occupied by the finders 74.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A macular reflectoscope comprising a main frame; mirrors supported by said main frame; a trial frame carried by said main frame, said trial frame having its visual axis substantially in alignment with the lower one of said mirrors and below the upper one of said mirrors; a pivot for said latter mirror and means for varying its angular placement, said means comprising a screw supported by said main frame and acting against said upper mirror to rotate the latter upon its pivot.

2. A macular reflectoscope comprising a main frame; mirrors supported by said main frame; a trial frame carried by said main frame, said trial frame having its visual axis substantially in alignment with the lower one of said mirrors and below the upper one of said mirrors; a pivot for said latter mirror and means for varying its angular placement, said means comprising a screw rotatably supported by said main frame and acting against said upper mirror to rotate the latter in a plane parallel to the line of vision; and a second screw adapted to move said mirror in an arc substantially at right angles to the line of vision.

3. In a reflectoscope having a mirror adapted to reflect rays from a test character into the eyes of a patient; means for adjusting the angle of said mirror, said means comprising a support; a horizontally placed, U-shaped spring; one leg of said spring being attached to said support; hinges for said mirror carried by the other leg of said spring; and an adjusting screw adapted to contact with one leg of said spring so as to close or spread said U.

4. In a reflectoscope having a mirror adapted to reflect rays from a test character into the eyes of a patient; means for adjusting the angle of said mirror, said means comprising a support; hinges supported by said support; a mirror frame carried by said hinges and supporting said mirror; and an adjusting screw carried by said support and adapted to contact with said mirror frame so as to rotate the latter on its hinges.

5. In a reflectoscope having a mirror adapted to reflect rays from a test character; a second mirror which reflects said rays into the eyes of a patient; a main frame; a bracket slidably mounted on said main frame; a column carried by said bracket and adapted to support said second mirror above said first mirror; and means for locking said column, bracket and frame in any desired relation to each other.

6. In a reflectoscope having a mirror adapted to reflect rays from a test character into the eyes of a patient; a main frame; a bracket slidably mounted on said main frame; a hollow column carried by said bracket and adapted to support said mirror; and means for locking said column, bracket and frame in any desired relation to each other, said means comprising a block arranged on the interior of said column; a clamp screw threaded into said block and arranged to pass through said column and said bracket and contact with said main frame.

7. In an optometer, means for supporting the chin of a patient comprising a support; a member horizontally movable on said support; a chin rest vertically movable on one extremity of said member; and means for maintaining said chin rest at any desired vertical position, said means comprising substantially parallel arms pivoted to said chin rest at their one extremity and to said member at their other extremity; a cam carried by said member and adapted to engage one of said arms so as to cause it to raise or lower said chin rest and maintain it in any desired position.

8. In an optometer, means for supporting the chin of a patient comprising a support; a member horizontally movable on said support; a chin rest vertically movable on said member; and means for maintaining said chin rest at any desired vertical position, said means comprising a rotatable cam carried by said member and operatively connected to raise or lower said chin rest.

9. In an optometer, means for resting the forehead of a patient comprising a support; a frame member carried by said support; a carriage slidably mounted in said frame member; a forehead rest carried at one extremity of said carriage; and means for sliding said carriage in said frame member, said means comprising a compound screw having portions threaded in opposite directions, one of said portions engaging said frame member and the other of said portions operatively connected to said carriage.

10. In a reflectoscope having a fixation object mirror; means for maintaining said mirror in either the operative or inoperative positions, said means comprising a support; a pivot pin carried by said support; a hinge arm carrying said mirror and threaded on said pivot pin so that angular movement of the hinge arm will cause horizontal movement thereof along said pivot pin; and means for limiting said horizontal movement.

11. In a reflectoscope having a fixation object mirror; means for maintaining said mirror in either the operative or inoperative positions, said means comprising a support; a pivot pin carried by said support; a hinge arm carrying said mirror and threaded on said pivot pin so that angular movement of the hinge arm will cause horizontal movement thereof along said pivot pin; and means for limiting said horizontal movement, said means comprising a hub on said hinge arm concentric with said pivot pin; and a cup carried by said support and adapted to receive said hub when said mirror is in the operative position.

12. Means for leveling an optometer comprising a rigid supporting frame; a pivot carried by said supporting frame and supporting said optometer; a spring acting to turn said optometer in one direction about said pivot; and an adjusting screw arranged to limit the movement of said spring and turn said optometer in the other direction about said pivot.

13. Supporting means for an optometer comprising a vertical column; a bracket vertically slidable on said column; a supporting arm secured in said bracket and adapted to support said optometer; and means for maintaining said bracket at any desired vertical position on said column, said means comprising a shoe adapted to contact with said column; and a spring arranged to maintain said shoe in frictional engagement with said column.

14. Supporting means for an optometer comprising a vertical column; a bracket vertically slidable on said column; a supporting arm secured in said bracket and adapted to support said optometer; means for locating and maintaining said optometer in a fixed angular relation to said column, said means comprising a longitudinal groove formed in said column; a shoe adapted to ride in said groove; a spring arranged to maintain said shoe in said groove; and a lever adapted to raise said shoe from said groove, said shoe preventing horizontal rotation about said column when in engagement with said groove.

15. Supporting means for an optometer comprising a vertical column; a bracket vertically slidable on said column; a supporting arm secured in said bracket and adapted to support said optometer; and means for supporting said bracket at any desired vertical position on said column, said means comprising a collar surrounding said column; a circumferential groove formed in said collar; tongues on said bracket adapted to engage in said groove, said tongues arranged to allow relative rotation between said collar and said bracket but prevent separation thereof; and means for supporting said collar at any desired position on said column.

16. Supporting means for an optometer comprising a vertical column; a bracket vertically slidable on said column; a supporting arm secured in said bracket and adapted to support said optometer; and means for supporting said bracket at any desired vertical position on said column, said means comprising a collar surrounding said column; a circumferential groove formed in said collar; tongues on said bracket adapted to engage in said groove, said tongues arranged to allow relative rotation between said collar and said bracket but prevent separation thereof; means for supporting said collar at any desired position on said column; and a projection in said collar adapted to ride in a longitudinal groove in said column and prevent rotation of said collar.

17. Means for supporting an optometer comprising a carriage supporting said optometer and arranged to one side of the line of vision thereof; a frame; horizontal tracks on said frame on which said carriage rides; a vertical hinge for said frame; and a base for the support of said hinge.

18. In a reflectoscope having a fixation object mirror; a shaft arranged at the rear of and parallel to said mirror; sleeves surrounding said shaft and maintaining frictional-engagement therewith; finders rotatably mounted on said sleeves and adapted to project over a portion of the face of said mirror, when in one position, and lie at the rear of said mirror, when in another position; a sighting portion carried by said finders and arranged to be visible when said finders are in the latter position.

In testimony whereof, I affix my signature.

CHARLES E. H. ARMBRUSTER.